United States Patent
Sudo et al.

(10) Patent No.: US 7,146,195 B2
(45) Date of Patent: Dec. 5, 2006

(54) HINGE DEVICE AND CELL PHONE USING THE HINGE DEVICE

(75) Inventors: Hiroshi Sudo, Tokyo (JP); Minoru Hayashi, Iida (JP)

(73) Assignee: Ohashi Technica, Inc., Tokyo (JP)

( * ) Notice: Subject to any disclaimer, the term of this patent is extended or adjusted under 35 U.S.C. 154(b) by 0 days.

(21) Appl. No.: 10/492,836

(22) PCT Filed: Oct. 16, 2002

(86) PCT No.: PCT/JP02/10716

§ 371 (c)(1),
(2), (4) Date: Jan. 10, 2005

(87) PCT Pub. No.: WO03/033924

PCT Pub. Date: Apr. 24, 2003

(65) Prior Publication Data

US 2005/0119023 A1    Jun. 2, 2005

(30) Foreign Application Priority Data

Oct. 17, 2001    (JP)    ............................. 2001-319833

(51) Int. Cl.
*H04M 1/00*    (2006.01)
(52) U.S. Cl. ................ 455/575.1; 455/575.3; 455/575.4; 455/575.8; 379/433.13
(58) Field of Classification Search ............. 455/575.1, 455/575.3, 575.4, 575.8; 379/428.01, 430, 379/433.01, 433.13
See application file for complete search history.

(56) References Cited

U.S. PATENT DOCUMENTS 5,485,517 A * 1/1996 Gray ..................... 379/433.13

6,549,789 B1 * 4/2003 Kfoury ..................... 455/550.1
6,850,773 B1 * 2/2005 Ghassabian .............. 455/550.1
2003/0078069 A1 * 4/2003 Lindeman ................... 455/550

FOREIGN PATENT DOCUMENTS

| JP | 11-30226 | | 2/1999 |
|---|---|---|---|
| JP | 11-247840 | | 9/1999 |
| JP | 2000-196720 | | 7/2000 |
| JP | 2002-240636 | | 9/2000 |
| JP | 20002400636 | * | 9/2000 |
| JP | 2001-20939 | | 1/2001 |
| JP | 2001-193727 | | 7/2001 |

(Continued)

*Primary Examiner*—Matthew D. Anderson
*Assistant Examiner*—Tuan Pham
(74) *Attorney, Agent, or Firm*—Westerman, Hattori, Daniels & Adrian, LLP.

(57) ABSTRACT

A hinge device for use in a foldable device is provided which allows the cover member to be pivoted clockwise and counterclockwise so that the cover member can be used in a variety of ways and also has an excellent functionality. A cellphone using such a hinge device is also provided. A hinge device connecting a body member 13 and a cover member 12 comprises: open-close hinge units 3, 4 to open and close the cover member 12 and to hold the open cover member 12 at a first open position where a cellphone operation can be performed; and a pivotal hinge unit 4 secured to the body member 13 and activated when the cover member 12 is opened beyond the first open position, the pivotal hinge unit 4 being adapted to pivot the cover member 12 clockwise or counterclockwise and to hold the cover member 12 at a pivotal position 90 or 180 degrees clockwise or counterclockwise from the body member.

7 Claims, 18 Drawing Sheets

FOREIGN PATENT DOCUMENTS

| | | |
|---|---|---|
| JP | 2001-251406 | 9/2001 |
| JP | 2002-135380 | 5/2002 |
| JP | 2002-141984 | 5/2002 |
| JP | 2002-155923 | 5/2002 |
| JP | 2002-171189 | 6/2002 |
| JP | 2002-310134 | 10/2002 |

* cited by examiner (a)

(b) (c) (d) (e)

(a)

(b)

(c)

(d)

(a)

(b)

(c)

(d)

F I G. 9
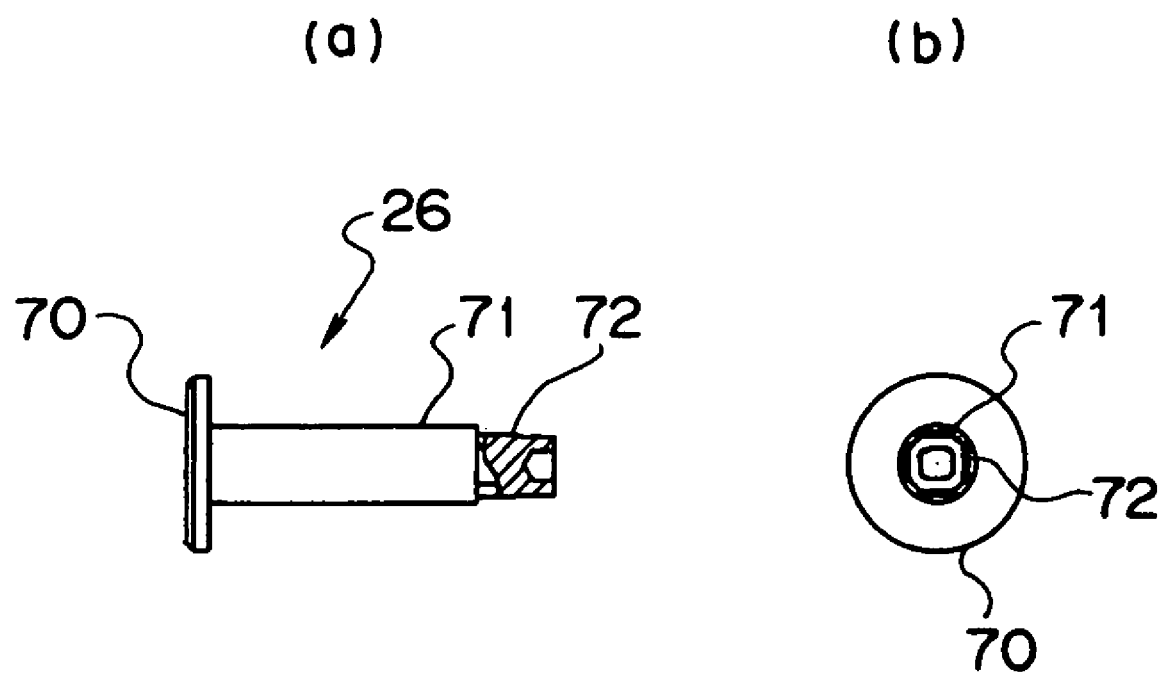

(a)

(b)

(c)

(d)

(e)

(a)

(b)

(c)

(d)

(a)

(b)

(a)

(b)

(c)

(d)

(a)

(b)

(c)

(d)

(a)

(b)

(c)

(d)

(a)　　　(b)　(c)

(d)

(a)

(b)

(c)

HINGE DEVICE AND CELL PHONE USING THE HINGE DEVICE

FIELD OF THE INVENTION

The present invention relates to a hinge device used in foldable devices and a foldable cellphone using the hinge device.

RELATED ART

In recent years portable devices have come into wide use which, when in use, secure a large enough area for manipulation or display and, when not in use, can be folded into a compact size for easy carrying. One such example is a foldable cellphone or mobile phone that has a body member as a transmitter unit and a cover member as a receiver unit with a display, connected together so that they can be folded through a hinge device.

A commonly known hinge device installed between the body member and the cover member of the cellphone has a first hinge unit and a second hinge unit pivotally connected to the first hinge unit through a connecting shaft. The cylindrical first hinge unit has a movable member arranged therein and the second hinge unit has an engagement member that engages with the movable member to form a cam mechanism.

The hinge device of the above construction allows a pivotal motion of the first hinge unit and the second hinge unit relative to each other and thereby connects together the body member and the cover member of the cellphone such that they can be opened and closed. In the cellphone using this hinge device, the cover member can be opened or closed only forward and backward or in a longitudinal direction.

The cover member of the portable device generally has a rectangular display which is vertically elongate when the cover member is open. A screen size of the display is becoming larger in recent years as the volume of information to be displayed increases. When information such as characters and symbols is to be shown on this display, it is normally displayed horizontally for ease of reading. However, characters, if displayed in horizontal lines on the vertically elongate display, are difficult to read, particularly when the volume of information is large.

In this case, it is possible to form the body of the portable device in a laterally elongate shape so that the display is also laterally elongate. The laterally elongate body, however, has a problem of bad operability as is easily found when it is operated with one hand.

The present invention has been accomplished with a view to overcoming the problems described above. It is therefore an object of this invention to provide a hinge device and a cellphone using the hinge device that allow the cover member to be turned or folded left and right for its multiple motions and which have an excellent functionality.

DISCLOSURE OF THE INVENTION

To solve the technical problems described above, this invention provides a hinge device connecting a body member 13 and a cover member 12, which comprises: a horizontally extending open-close hinge unit 3, 4 to open and close the cover member 12 and to hold the open cover member 12 at a first open position where a cellphone operation can be performed; and a vertically extending pivotal hinge unit 4 secured to the body member 13 and, when the cover member 12 is opened beyond the first open position, activated to allow the cover member to pivot clockwise or counterclockwise, the pivotal hinge unit 4 being adapted to hold the cover member 12 at a pivotal position 90 or 180 degrees clockwise or counterclockwise from the body member. The pivotal hinge unit 4 may of course be constructed so as to be able to hold the cover member 12 at pivotal positions 90 degrees and 180 degrees clockwise or counterclockwise from the body member.

Further, another hinge device connecting the body member 13 and the cover member 12, according to this invention, comprises: a horizontally extending open-close hinge unit 2, 3 to open and close the cover member 12 and to hold the cover member 12 at a first open position where a cellphone operation can be performed; a vertically extending pivotal hinge unit 4 secured to the body member 13 to pivot the cover member 12 clockwise or counterclockwise; and a means to enable a pivotal motion of the pivotal hinge unit 4 when the cover member 12 is opened beyond the first open position where a cellphone operation can be performed; wherein the pivotal hinge unit 4 includes: a cylindrical base 15 mounting the open-close hinge unit 2, 3; a second disk 32 secured to the body member 13 and pivotally supporting the base 14; and a second spacer 34 arranged to pivot with the base 15 and also pivot relative to the second disk 32 upon the enabling of the pivotal motion, the second spacer 34 being adapted to engage and be held to the second disk 32 by a biasing force at a pivotal position of the cover member 12 90 or 180 degrees clockwise or counterclockwise from the body member. The pivotal hinge unit 4 may of course be constructed so as to be able to hold the cover member 12 at pivotal positions 90 degrees and 180 degrees clockwise or counterclockwise from the body member.

Further, still another hinge device connecting the body member 13 and the cover member 12, according to this invention, comprises: a horizontally extending open-close hinge unit 2, 3 to open and close the cover member 12; a vertically extending pivotal hinge unit 4 secured to the body member 13 to pivot the cover member 12 clockwise or counterclockwise; and a means to enable a pivotal motion of the pivotal hinge unit 4 when the cover member 12 is opened beyond the first open position where a cellphone operation can be performed; wherein the open-close hinge unit 2, 3 includes: a first disk 21 secured to the pivotal hinge unit 4; and a first spacer 23 arranged pivotable relative to the first disk 21 and adapted to engage and be held to the first disk 21 by a biasing force at the first open position; wherein the pivotal hinge unit 4 includes: a cylindrical base 15 mounting the open-close hinge unit 2, 3; a stationary plate 31 secured to the body member 13 and pivotally supporting the base 15; a second disk 32 secured to the stationary plate 31; and a second spacer 34 arranged to pivot with the base 15 and also pivot relative to the second disk 32 upon the enabling of the pivotal motion, the second spacer 34 being adapted to engage and be held to the second disk 32 by a biasing force at a pivotal position of the cover member 90 or 180 degrees clockwise or counterclockwise from the body member. The pivotal hinge unit 4 may of course be constructed so as to be able to hold the cover member 12 at pivotal positions 90 degrees and 180 degrees clockwise or counterclockwise from the body member.

In the hinge device according to this invention, the means to enable the pivotal motion includes: an annular cam member 27 installed in the open-close hinge unit 2, 3, the cam member 27 being adapted to pivot with the first spacer 23 as the cover member 12 is opened and closed; and a locking member 36 arranged in the pivotal hinge unit 4 to engage an outer circumference of the cam member 27, the locking member 36 being adapted to move up or down as the cam member 27 pivots, the locking member 36 being released from the stationary plate 31 to enable the pivotal motion of the second spacer 34 when the cover member 12 is opened beyond the first open position.

In the hinge device according to this invention, the first open position of the cover member 12 has an opening angle to the body member 13 of less than 180 degrees.

In the hinge device according to this invention, the first disk 21 of the open-close hinge unit 2, 3 is formed with concentric circular guide paths, these guide paths are formed with first recessed portions, and at positions in each of the guide paths shifted to left and right from a position which is center-symmetric with the first recessed portions, second and third recessed portions are formed; and balls 22 are arranged in the first spacer 23 so that they are interposed between the first spacer 23 and the first disk 21, and the first spacer 23 is biased so that it engages and is held to the second recessed portions when the cover member 12 is at the first open position and that, when the cover member 12 is opened beyond the first open position, the first spacer 23 engages and is held to the third recessed portions.

In the hinge device according to this invention, the stationary cylinder 38 erected on the stationary plate 31 has its top surface raised over a part of its whole circumference to form a projection; an annular first stopper 39 having a part of its whole circumference raised vertically upward and downward to form a thick engagement portion is pivotally mounted on the stationary cylinder so that the thick engagement portion engages the projection; and a second stopper 40 pivoting with the base 15 and having a part of a whole circumference of its hollow disk raised downward to form a thick locking portion is mounted on the first stopper 39 so that the thick locking portion engages the thick engagement portion.

In the hinge device according to this invention the body member 13 and the cover member 12 form a case or housing of a foldable portable device, and the cover member 12 is formed with a display 14 on that surface thereof which faces the body member 13 when the cover member 12 is closed onto the body member 13, the display being elongate in a direction perpendicular to an open-close axis.

In a cellphone of this invention that uses one of the hinge devices described above, the pivotal hinge unit 4 is secured to the body member 13 having a transmitter unit, the open-close hinge unit 2, 3 is secured to the cover member 12 having a receiver unit, and the body member 13 and the cover member 12 are connected together.

BRIEF DESCRIPTION OF THE DRAWINGS

FIG. 5(*a*) representing a left side view,

FIG. 5(*b*) a right side view, and

FIG. 5(*c*) a cross-sectional view taken along the line A—A.

FIG. 6(*a*) representing a left side view,

FIG. 6(*b*) a cross-sectional view taken along the line B—B,

FIG. 6(*c*) a cross-sectional view taken along the line C—C,

FIG. 6(*d*) a cross-sectional view taken along the line D—D, and

FIG. 6(*e*) a cross-sectional view taken along the line E—E.

FIG. 7(*a*) representing a left side view,

FIG. 7(*b*) a plan view,

FIG. 7(*c*) a right side view, and

FIG. 7*d*) a cross-sectional view taken along the line F—F.

FIG. 8(*a*) representing a front view,

FIG. 8(*b*) a left side view,

FIG. 8(*c*) a right side view, and

FIG. 8(*d*) a cross-sectional view taken along the line G—G.

FIG. 9 illustrates a shaft of the hinge device,

FIG. 9(*a*) representing a front view and

FIG. 9(*b*) a right side view.

FIG. 10(*a*) representing a left side view,

FIG. 10(*b*) a right side view,

FIG. 10(*c*) a cross-sectional view taken along the line H—H,

FIG. 10(*d*) a cross-sectional view taken along the line I—I, and

FIG. 10(*e*) a cross-sectional view taken along the line J—J.

FIG. 11(*a*) representing a plan view and

FIG. 11(*b*) a cross-sectional view taken along the line K—K.

FIG. 12(*a*) representing a plan view,

FIG. 12(*b*) a cross-sectional view taken along the line L—L,

FIG. 12(*c*) a bottom view, and

FIG. 12(*d*) a cross-sectional view taken along the line M—M.

FIG. 13(*a*) a left side view and

FIG. 13(*b*) a bottom view.

FIG. 14(*a*) representing a plan view,

FIG. 14(*b*) a side view,

FIG. 14(*c*) a bottom view, and

FIG. 14(*d*) a front view.

FIG. 15(*a*) representing a plan view,

FIG. 15(*b*) a front view,

FIG. 15(*c*) a bottom view, and

FIG. 15(*d*) a cross-sectional view taken along the line N—N.

FIG. 16(*a*) representing a plan view,

FIG. 16(*b*) a side view,

FIG. 16(*c*) a cross-sectional view taken along the line O—O, and

FIG. 16(*d*) a rear view.

FIG. 17(*a*) representing a bottom view,

FIG. 17(*b*) a front view,

FIG. 17(c) a cross-sectional view taken along the line P—P, and

FIG. 17(d) a left side view.

FIG. 18(a) representing a left side view,

FIG. 18(b) a plan view and

FIG. 18(c) a cross-sectional view taken along the line Q—Q.

BEST MODE FOR IMPLEMENTING THE INVENTION

Now, one embodiment of this invention will be described by referring to the accompanying drawings.

Figure 1:
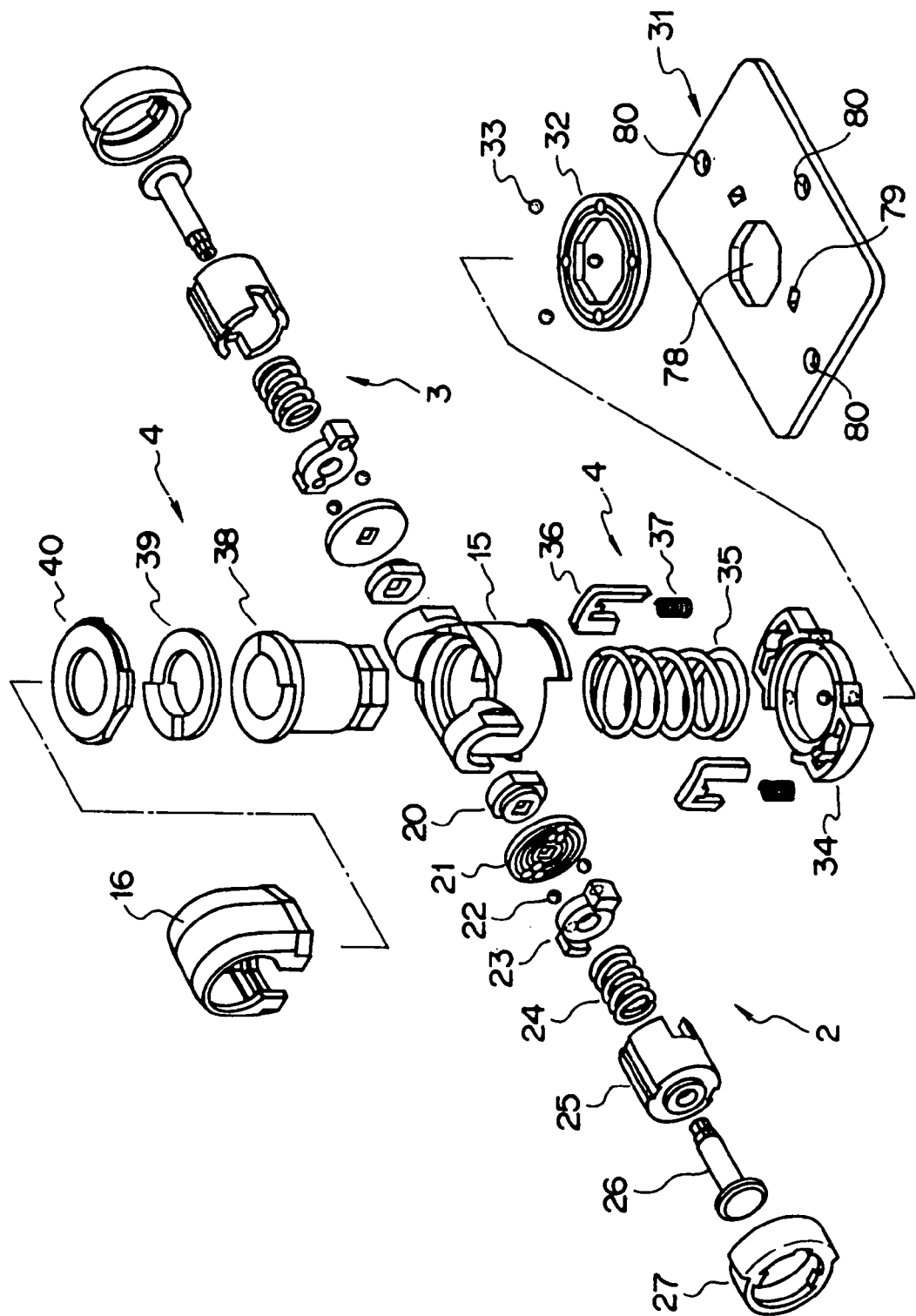
FIG. 1 is an exploded perspective view of a hinge device according to one embodiment of this invention.
Figure 2:
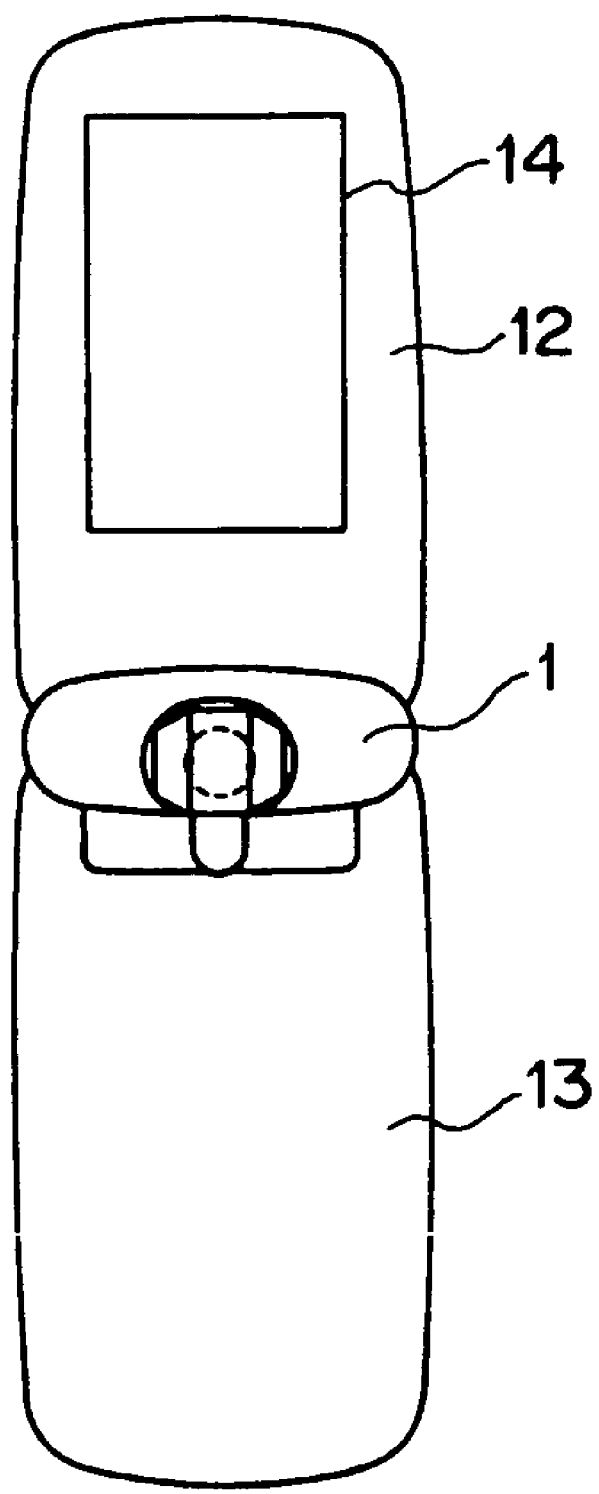
FIG. 2 illustrates a cellphone using the hinge device of the embodiment.

FIG. 1 is an exploded perspective view showing a hinge device 1 of this embodiment used in a portable device such as a foldable cellphone. The foldable cellphone using this hinge device 1 has, as shown in FIG. 2, a cover member 12 as a receiver unit provided with a vertically elongate display 14 and a body member 13 as a transmitter unit provided with operation keys.

Figure 3:
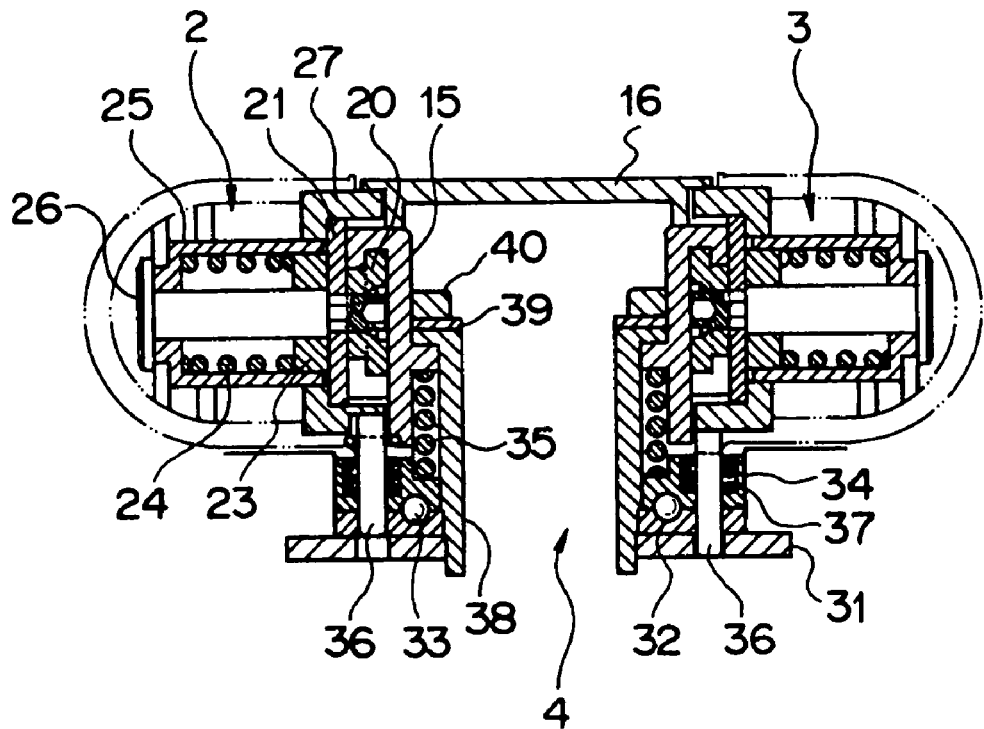
FIG. 3 is a cross-sectional view of the hinge device of the embodiment.
Figure 4:
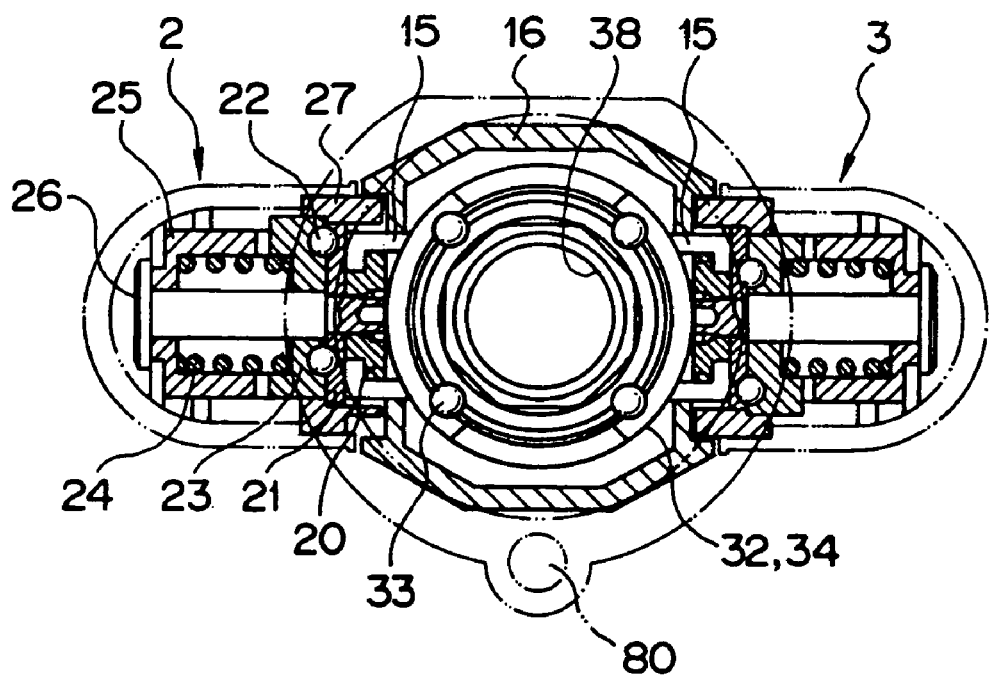
FIG. 4 is another cross-sectional view of the hinge device of the embodiment.

As shown in FIG. 3 and FIG. 4, this hinge device 1 has a pair of open-close hinge unit 2, 3, used to open and close the cover member 12 forward and backward, and a pivotal hinge unit 4 used to pivot the cover member 12 left or right. With a base 15 situated at the center of the hinge device 1, the open-close hinge units 2, 3 shaped like horizontal shafts are provided on the left and right side of the base 15. The pivotal hinge unit 4, shaped like a vertical shaft, is formed integral with the base 15. The pivotal hinge unit 4 is attached with a dome-shaped cover 16 that encloses the hinge device almost entirely.

The open-close hinge unit 2 has as its constituent members a hook 20, a first disk 21, two balls 22, a first spacer 23, a coil spring 24, a case 25, a shaft 26 and a cam member 27. The open-close hinge unit 3 is mounted on the base 15 on a side opposite the open-close hinge unit 2. Components of the open-close hinge unit 3, though arranged symmetrical to the counterparts of the open-close hinge unit 2, have basically the same structures and thus explanations for the open-close hinge unit 3 will not be given here.

The first spacer 23 and the case 25 are formed of synthetic resin such as POM, the shaft 26 is formed of a metal such as aluminum or steel, and the coil spring 24 is made of steel. The hook 20, first disk 21, balls 22 and cam member 27 are made of a metal such as steel and stainless steel. The first disk 21, cam member 27 and shaft 26 are desirably surface-treated as by electroless nickel plating or nickel electroplating.

Figure 5:
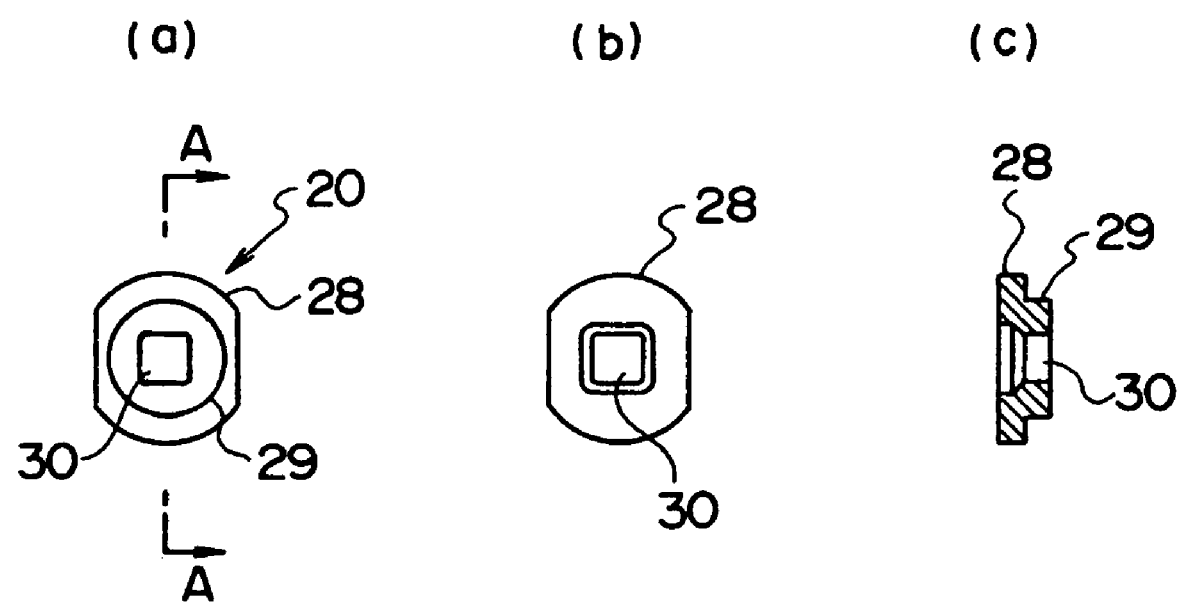
FIG. 5 shows a hook of the hinge device.

Here, each constituent member will be explained. The hook 20, as shown in FIG. 5, has a base plate portion 28 and a disk plate portion 29 protruding from a central part of the base plate portion 28. The base plate portion 28 is formed with parallel, planar side portions at its sides and with arc portions at its top and bottom. The hook 20 has a square through-hole 30 formed at its center, which is larger in the base plate portion 28 than in the disk plate portion 29.

Figure 6:
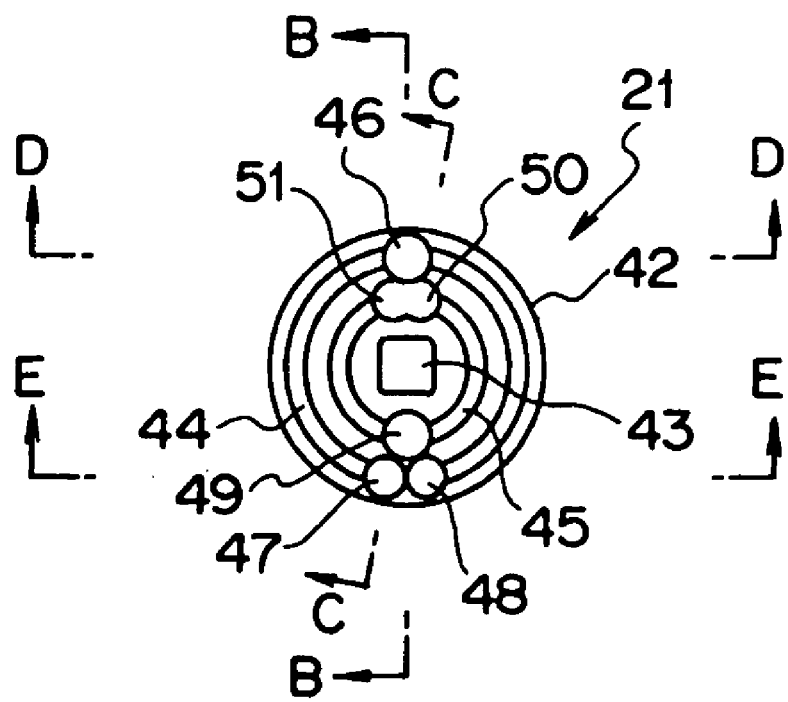
FIG. 6 illustrates a first disk of the hinge device.
Figure 6:
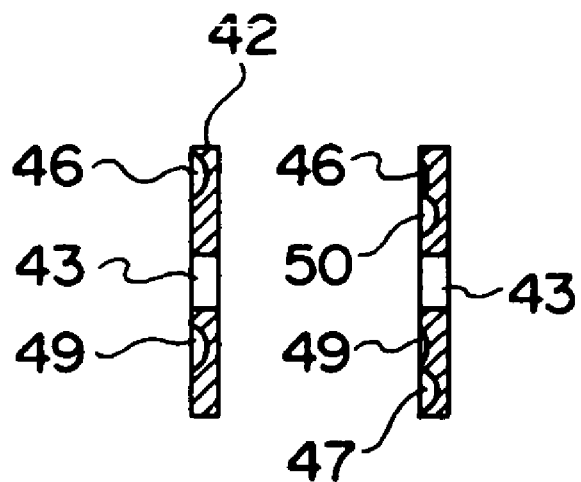
Figure 6:
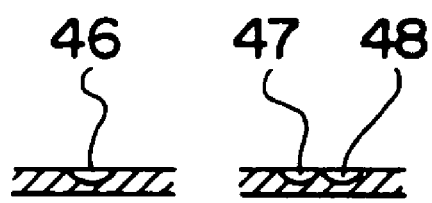

The first disk 21, as shown in FIG. 6, has a square hole 43 at a center of a circular base plate 42, in the surface of which are concentrically formed an outer circular guide path 44 and an inner circular guide path 45. These guide paths 44, 45 are shallow grooves. The outer guide path 44 has a first recessed portion 46. At positions in the outer guide path 44 shifted 10 degrees to the left and 10 degrees to the right from a position which is center-symmetric with the first recessed portion 46 there are formed a second recessed portion 47 and a third recessed portion 48. These recessed portions 46, 47, 48 are spherical dents, with a radius of the first recessed portion 46 set larger than those of the second and third recessed portions 47, 48.

The inner guide path 45, as with the outer guide path 44, has a first recessed portion 49, a second recessed portion 50 and a third recessed portion 51, with the second and third recessed portions 50, 51 formed at positions in the outer guide path 44 on the left and right side of a position center-symmetric with the first recessed portion 49. The first recessed portion 49 is provided on the same center line running through the first recessed portion 46 but on a side opposite the first recessed portion 46 with respect to the center.

Figure 7:
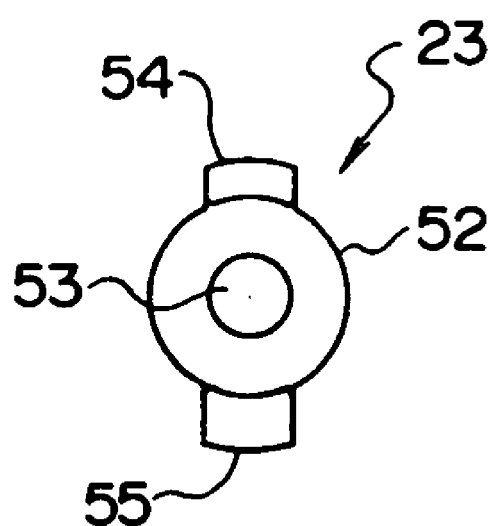
FIG. 7 illustrates a first spacer of the hinge device.
Figure 7:
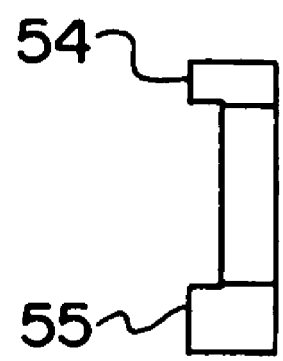
Figure 7:
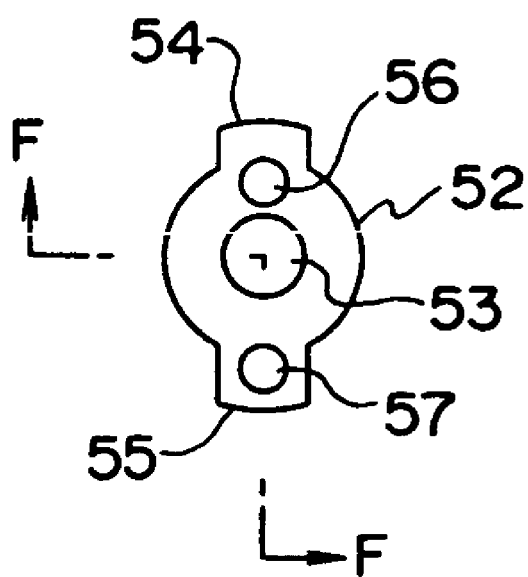
Figure 7:
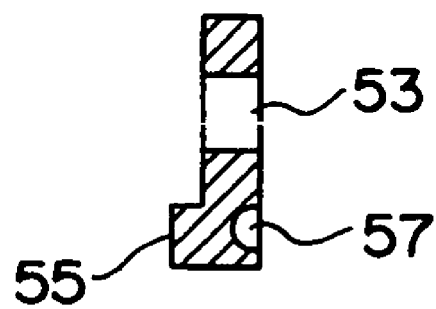

As shown in FIG. 7, the first spacer 23 has a circular hole 53 at a center of a circular plate portion 52 and also engagement portions 54, 55 radially protruding from top and bottom of the circular plate portion 52. One side surface of the first spacer 23 is formed planar. On this surface the engagement portions 54, 55 are formed with hemispheric deep holes 56, 57. These holes 56, 57 are formed-at different distances from the center of the circular hole 53, with the hole 57 located at a greater distance than the hole 56. These holes 56, 57 accommodate more than about half the balls 22 and rotatably hold them. The coil spring 24 is a compression spring and biases the first spacer 23.

Figure 8:
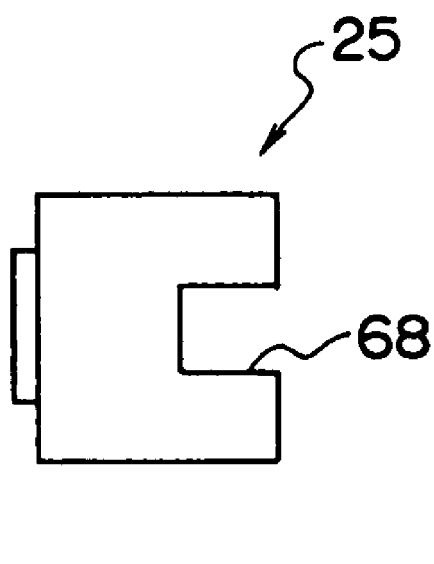
FIG. 8 illustrates a case of the hinge device.
Figure 8:
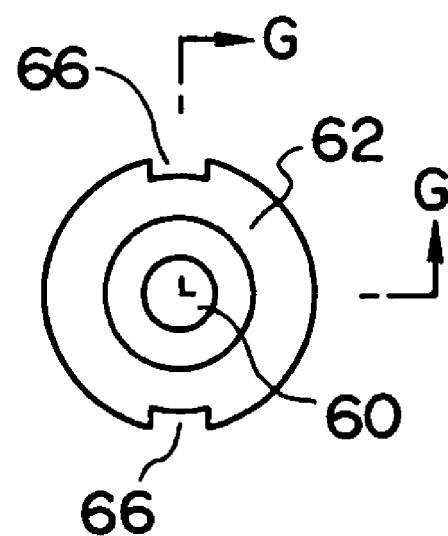
Figure 8:
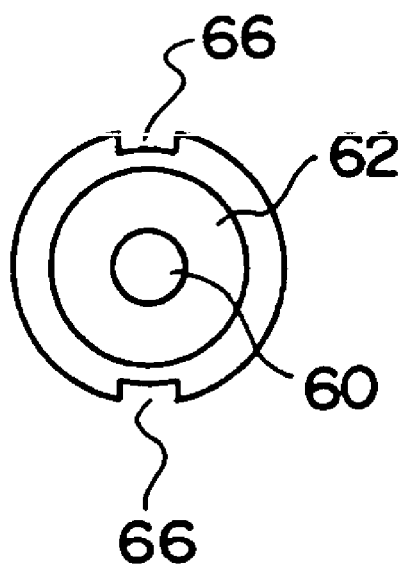
Figure 8:
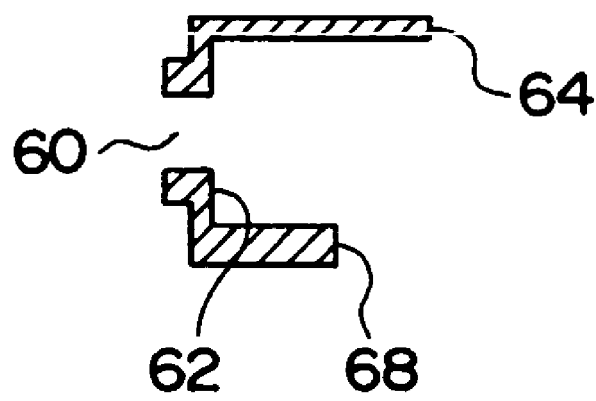

The case 25, as shown in FIG. 8, is a cylindrical container which has at one end side a bottom portion 62 formed with a through-hole 60 at its center and, at the other end side, an opening 64. The case 25 also has axially extending grooves 66 formed one in its top and one in its bottom. Left and right side portions of the case 25 are each formed with an engagement notch 68 of a predetermined vertical width. The shaft 26, as shown in FIG. 9, has a disk-shaped head portion 70 and a shaft portion 71. The shaft portion 71 is circular in cross section but, at its front end portion, has a square portion 72 which is square in cross section.

Figure 10:
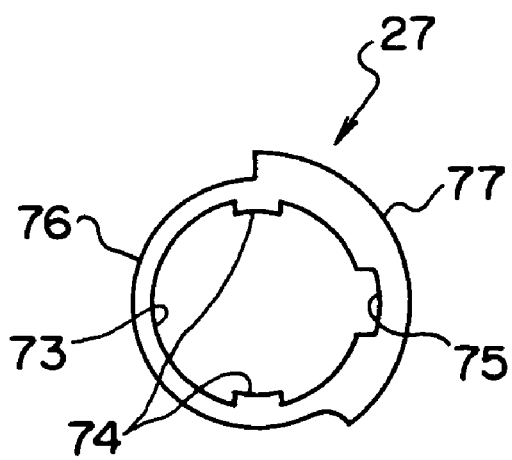
FIG. 10 illustrates a cam of the hinge device.
Figure 10:
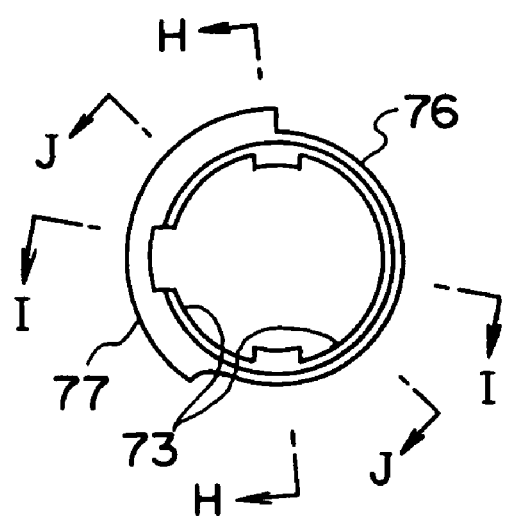
Figure 10:
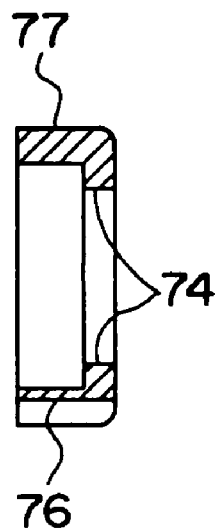
Figure 10:
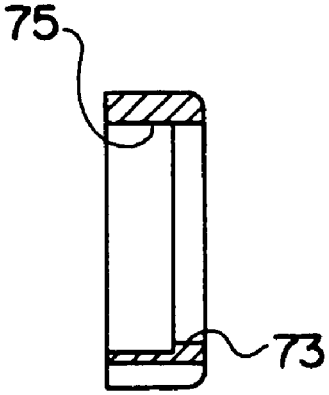
Figure 10:
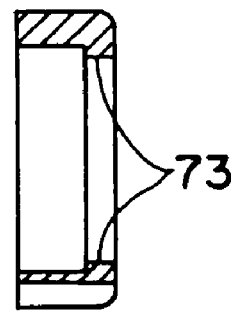

The cam member 27 is an annular member which, as shown in FIG. 10, has a reduced-diameter portion 73 at one end of its cylindrical portion and engagement projections 74 protruding from top and bottom of the inner circumference toward the center. One of the left and right side portions of the cam member 27 is formed with a recess 75. On the outer circumference the cam member 27 is formed with a small-diameter portion 76 over 60 percent of its circumference and a large-diameter portion 77 over the remaining 40 percent.

The pivotal hinge unit 4 comprises a stationary plate 31, a second disk 32, four balls 33, a second spacer 34, a coil spring 35, a pair of locking member 36 and coil spring 37, a base 15, a stationary cylinder 38, a first stopper 39, a second stopper 40, and a cover 16.

The second spacer 34 and the cover 16 are formed of synthetic resin such as POM and ABS, and the coil springs 35, 37 are formed of steel material. The base 15, stationary plate 31, second disk 32, balls 33, locking member 36, stationary cylinder 38, first stopper 39 and second stopper 40 are formed of metal such as steel and stainless steel. It is preferred that the base 15, stationary plate 31, second disk 32, stationary cylinder 38, first stopper 39 and second stopper 40 be surface-treated as by electroless nickel plating or nickel electroplating.

Constituent members will be explained in the following. The stationary plate 31, as shown in FIG. 1, is a rectangular plate to fix the hinge device and has an octagonal hole 78 formed at its center. At two positions on the same circumference near and around the octagonal hole 78 parallelogrammatic locking holes 79 are formed in the stationary plate 31. At three locations near its periphery the stationary plate 31 is also formed with fixing holes 80.

Figure 11:
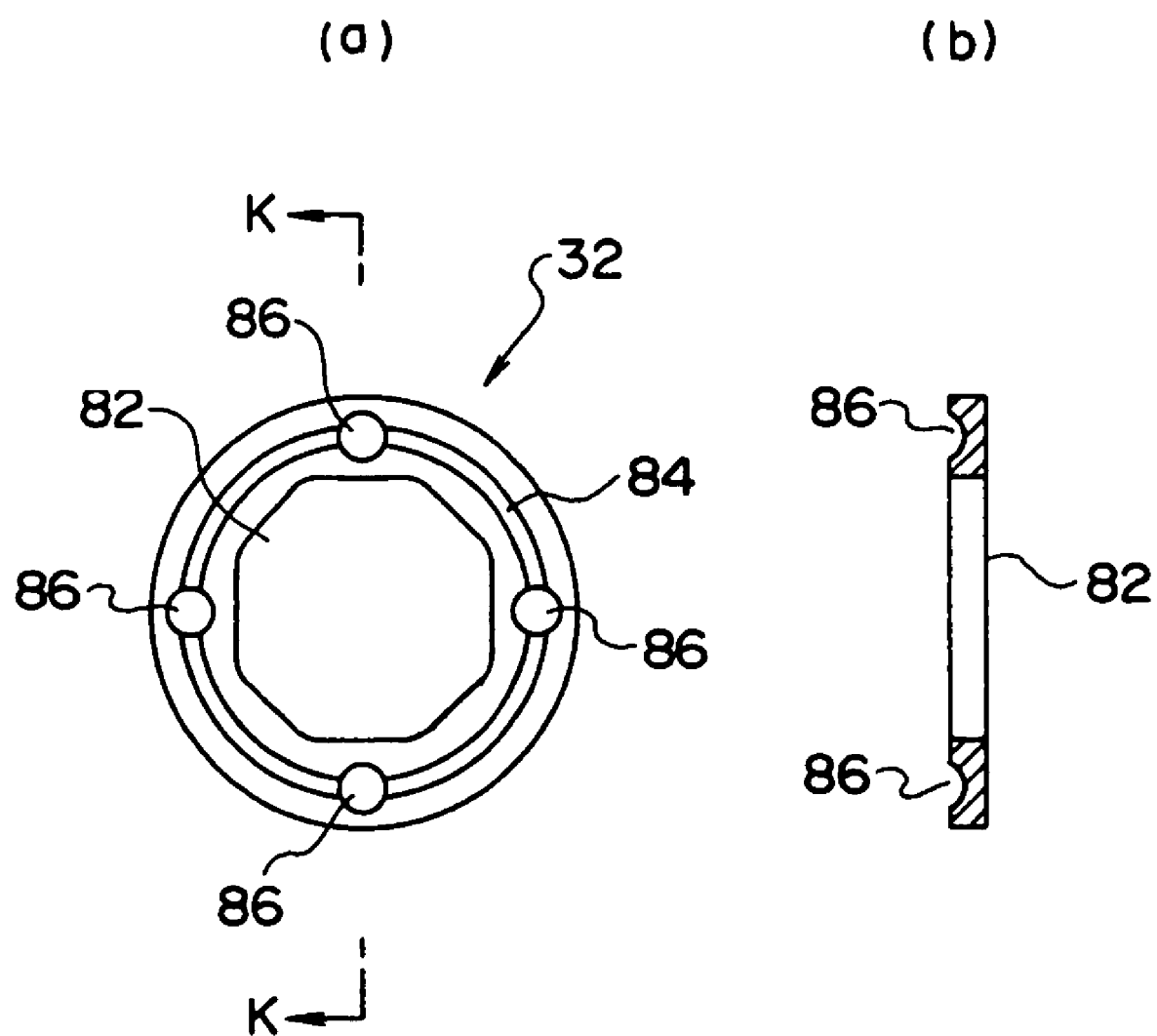
FIG. 11 illustrates a second disk of the hinge device.

The second disk 32 is a hollow disk which, as shown in FIG. 11, has an octagonal hole 82 at the center. A disk part of the second disk 32 has a guide path 84 in the form of a circular, shallow groove. In the guide path 84 there are formed spherical, shallow recesses 86 at four equidistantly spaced locations that are 90 degrees apart from each other with respect to the center.

Figure 12:
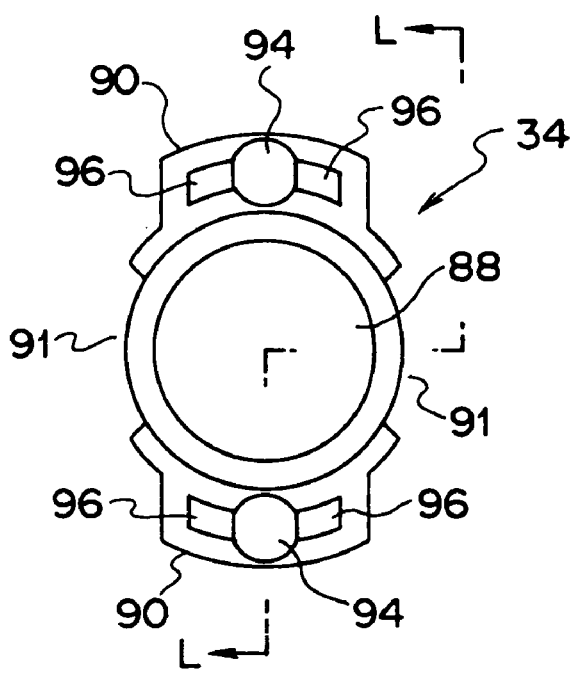
FIG. 12 illustrates a second spacer of the hinge device.
Figure 12:
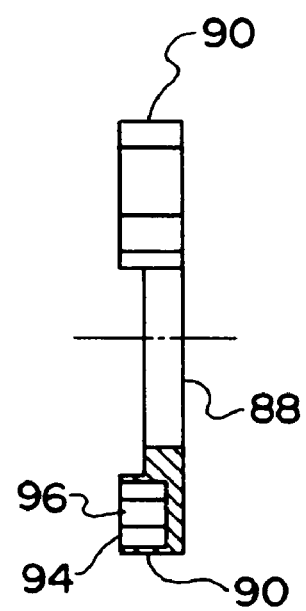
Figure 12:
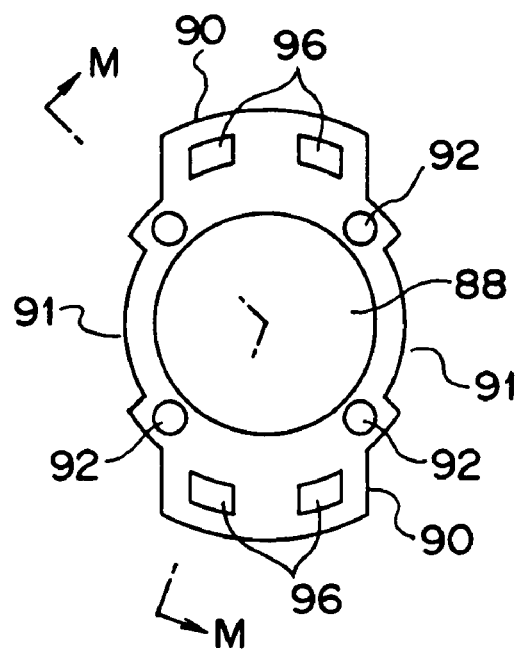
Figure 12:
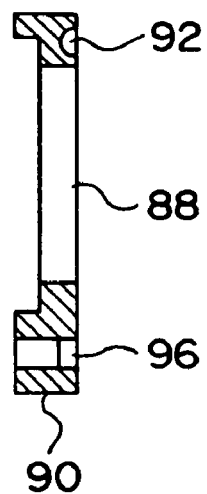

The second spacer 34 shown in FIG. 12 has a circular hole 88 at the center and engagement portions 90 protruding outwardly from the top and bottom thereof. Left and right side portions of the second spacer 34 are each formed with an engagement recess 91 whose outer diameter is smaller than the neighboring portions. On one of its surfaces the second spacer 34 is formed with hemispheric deep holes 92 at four equidistantly spaced locations on the same circle. These hemispheric deep holes 92 accommodate more than about half of each ball 33 and rotatably hold them. On the other surface the second spacer 34 is formed with circular cylinder holes 94 at a central part of each engagement portion 90. On the left and right side of the circular cylinder holes 94, square through-holes 96 square in cross section are formed in the engagement portions 90. The coil spring 35 is a compression spring to bias the second spacer 34.

Figure 13:
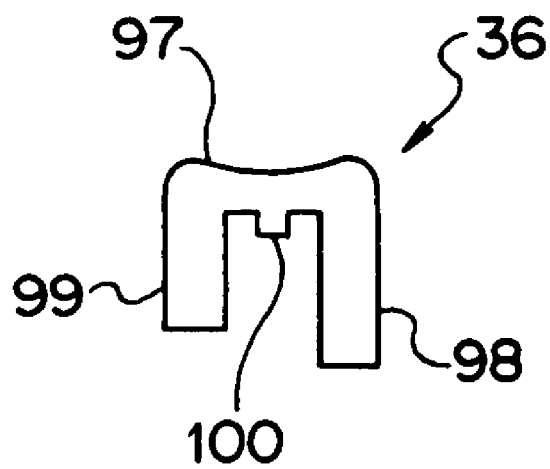
FIG. 13 illustrates a locking member of the hinge device.
Figure 13:
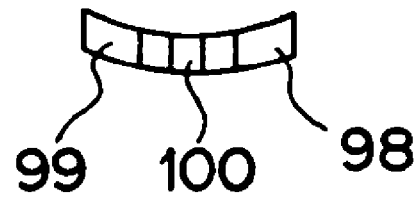

The locking-member 36 is arranged on each side of the second spacer 34. Each locking member 36 is shaped like an inverted character of U as shown in FIG. 13. An engagement portion 97 with its top surface depressed in arc has a long leg 98 extending down from one end thereof and a short leg 99 extending down from the other end. Between these legs the engagement portion 97 has a downwardly protruding projection 100. Another locking member 36 is shaped symmetrical to the above locking member 36. The coil springs 37 are compression springs to bias the locking members 36.

Figure 14:
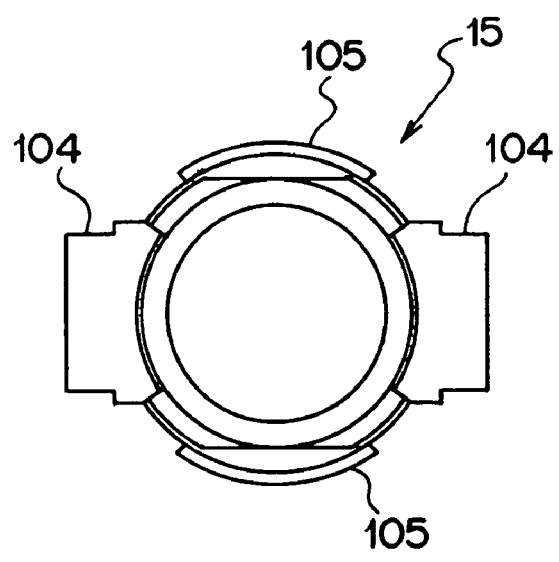
FIG. 14 illustrates a base of the hinge device.
Figure 14:
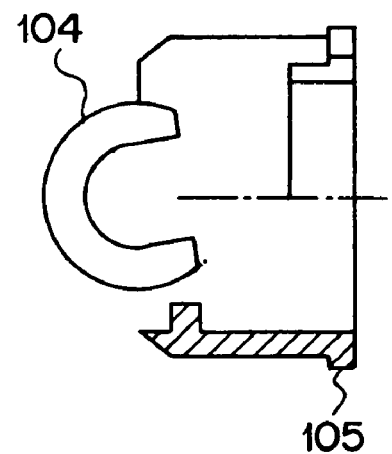
Figure 14:
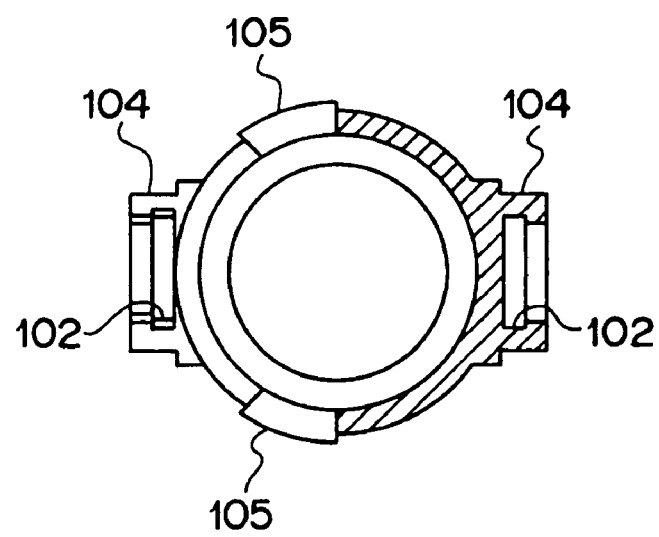
Figure 14:
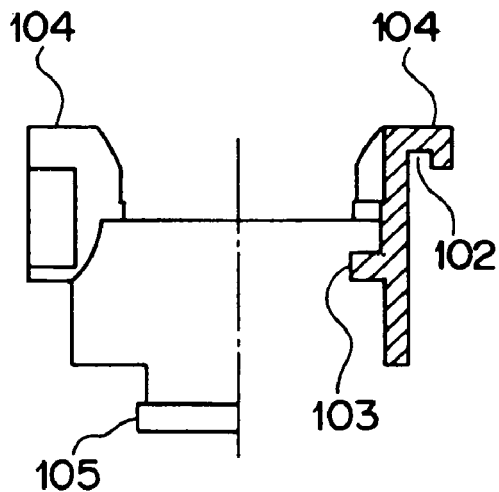

The base 15, as shown in FIG. 14, is shaped like a vertical cylinder and has inverted U-shaped engagement portions 104 protruding from left and right side of an upper, outer circumferential portion thereof. Each of the engagement portions 104 has an engagement groove 102 therein. The base 15 is also formed with downwardly protruding engagement projections 105 at front and rear side of a lower portion thereof. An inner, intermediate part of the cylinder is provided with an engagement ring 103 whose inner diameter is smaller than other parts of the cylinder.

Figure 15:
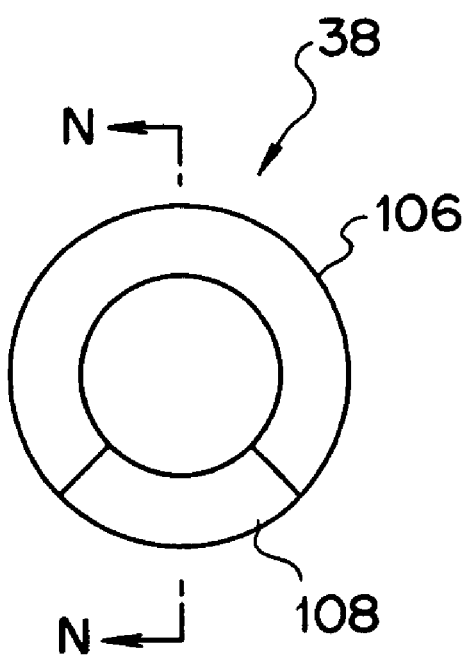
FIG. 15 illustrates a stationary cylinder of the hinge device.
Figure 15:
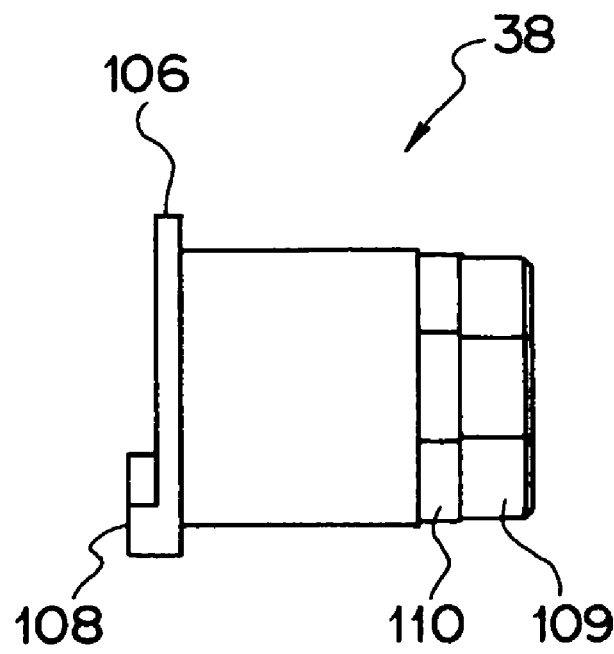
Figure 15:
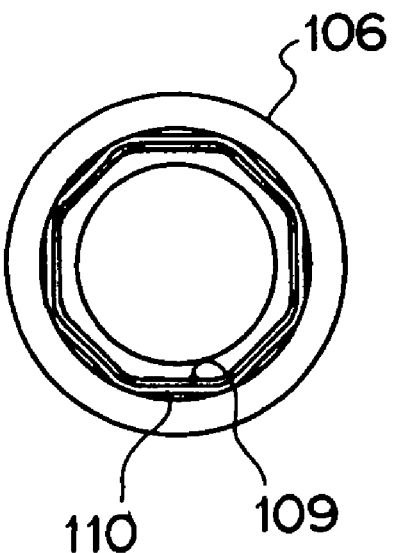
Figure 15:
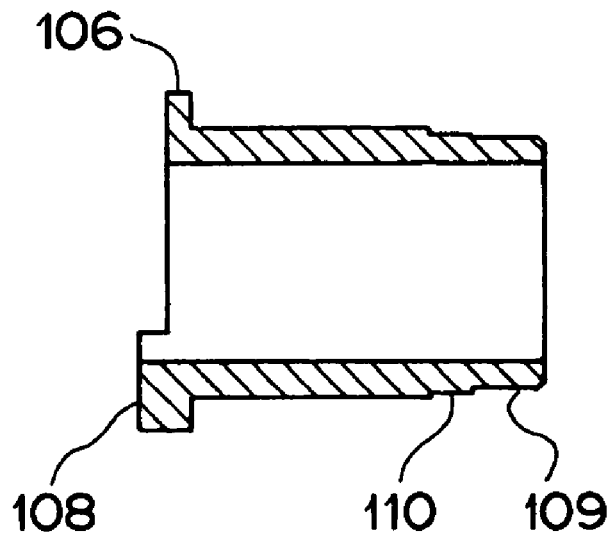

The stationary cylinder 38 is shaped like a cylinder which, as shown in FIG. 15, has an upper end thereof expanded in outer diameter to form an engagement ring 106. On its upper surface the engagement ring 106 is raised over a range of 90 degrees, one quarter of the whole circle, to form an upwardly protruding projection 108. The stationary cylinder 38 is also formed with a first octagonal cylinder portion 109 at its lowermost end portion and with a second octagonal cylinder portion 110 above the first octagonal cylinder portion 109 with their corners aligned. The second octagonal cylinder portion 110 is formed slightly larger in size than the first octagonal cylinder portion 109.

Figure 16:
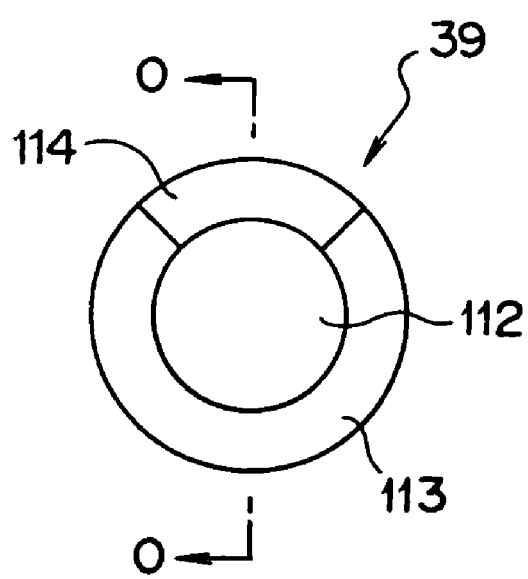
FIG. 16 illustrates a first stopper of the hinge device.
Figure 16:
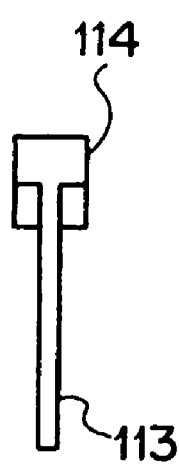
Figure 16:
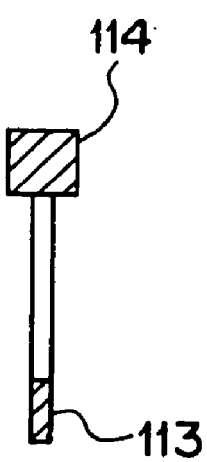
Figure 16:
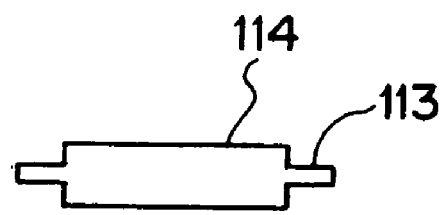

FIG. 16 shows the first stopper 39 constructed of a hollow disk 113 with a circular hole 112. The hollow disk 113 has its 90-degree segment, one quarter of the entire circumference, raised vertically upward and downward to form a thick engagement portion 114, with the remaining three quarters of the disk formed thin.

Figure 17:
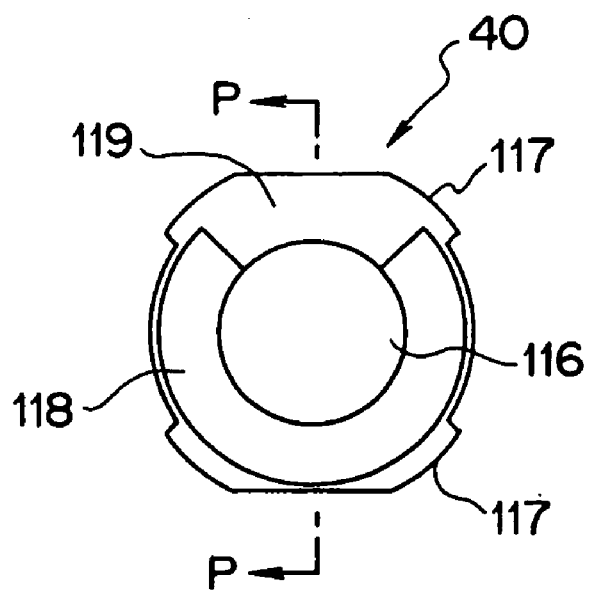
FIG. 17 illustrates a second stopper of the hinge device.
Figure 17:
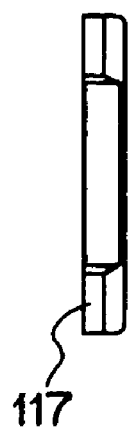
Figure 17:
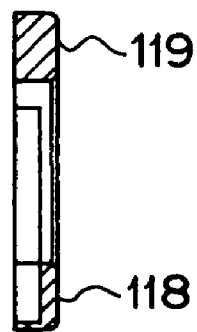
Figure 17:
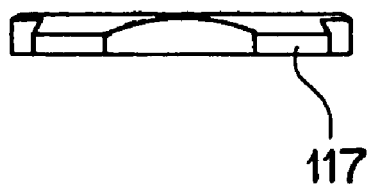

The second stopper 40 shown in FIG. 17 is constructed of a hollow disk with a circular hole 116. The hollow disk has locking portions 117 with a larger outer diameter at its four peripheral locations. The second stopper 40 is formed with a thick locking portion 119 protruding toward the first stopper 39, over a range of 90 degrees, one quarter of the entire circumference of the second stopper 40. In the remaining three quarters the second stopper 40 is formed with an annular portion 118 in which the thick engagement portion 114 is received.

According to the relative positions among the projection 108, the thick engagement portion 114 and the thick locking portion 119, the pivotal motions of the second stopper 40 and the base 15 are limited to 180 degrees clockwise or counterclockwise. If the angular range of the thick locking portion 119 is other than 90 degrees, setting the angular ranges of the thick locking portion 119 and the projection 108 equal and setting a sum of the angular ranges of the thick locking portion 119 and the thick engagement portion 114 to 180 degrees can similarly limit the pivotal motion of the base 15 to 180 degrees.

Figure 18:
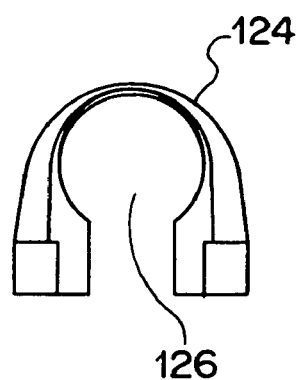
FIG. 18 illustrates a cover of the hinge device.
Figure 18:
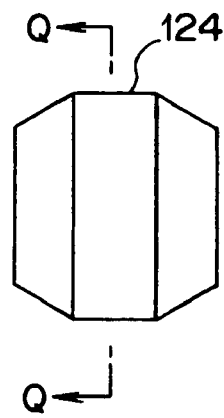
Figure 18:
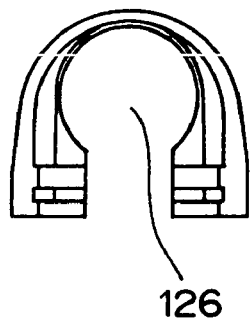

The cover 16 has a dome-like cover portion 124 generally inverted U-shaped in cross section, as shown in FIG. 18, with its left and right side portions formed with an opening 126 which is circular at a central part and column-like at a lower part.

The open-close hinge unit 2 of the hinge device 1 is assembled as follows. The coil spring 24 is axially installed in the case 25 and then the first spacer 23 is fitted to the case 25 against the force of the coil spring 24. At this time, the engagement portions 54, 55 of the first spacer 23, which holds the balls 22 in the holes 56, 57, are fitted in the engagement notches 68 of the case 25. As a result, the first spacer 23 is axially movable relative to the case 25 but circumferentially rotates with it. Then, the first disk 21 is mounted on the first spacer 23 so that the balls 22 fit in the outer guide path 44 and the inner guide path 45 of the first disk 21.

Then, with the hook 20 arranged on the outer side of the first disk 21, the shaft 26 is inserted into the through-hole 60 of the case 25 so that the coil spring 24, the first spacer 23, the first disk 21 and the hook 20 are sleeved over the shaft 26. The square portion 72 of the shaft 26 protruding from the hook 20 is caulked and fixed. Now, the open-close hinge unit 2 is assembled. At this time, the hook 20 and the first disk 21 are both fitted over the square portion 72 of the shaft 26. These three components form a stationary portion of the open-close hinge unit 2, and the cam member 27 and the case 25 along with the first spacer 23 form a pivotal portion.

Next, the base plate portion 28 of the hook 20 of the open-close hinge unit 2 is inserted from below into the engagement groove 102 on one side of the base 15 to mount the open-close hinge unit 2 to the engagement portion 104 of the base 15. As a last step, the engagement projections 74 of the cam member 27 are fitted into the grooves 66 of the case 25 of the open-close hinge unit 2. The cam member 27 is axially moved until it fits over the engagement portions 104 of the base 15 and the hook 20. As for the open-close hinge unit 3, the similar procedure is taken to mount it to the engagement portion 104 on the other side of the base 15.

The pivotal hinge unit 4 is assembled as follows. The second disk 32 is mounted on the stationary plate 31. On the second disk 32 the second spacer 34 having balls 33 in its four holes 92 is mounted so that the balls 33 are fitted in the guide path 84 of the second disk 32. Then, the coil spring 37 are vertically installed in the circular cylinder holes 94 at both steps of the second spacer 34, and the legs 98, 99 of the locking members 36 are each fitted into the square through-holes 96 of the second spacer 34, with the upper part of each coil spring 37 fitted over the projection 100 of each locking member 36. In this state, the locking members 36 on both sides of the second spacer 34 can have their long legs 98 fit into the locking holes 79 of the stationary plate 31.

Then, the coil spring 35 is placed on the second spacer 34 and the base 15 is fitted from above over the coil spring 35. The stationary cylinder 38 is inserted from above into the base 15 so that it loosely comes into the coil spring 35 in the base 15. In this state, the stationary cylinder 38 is pushed down against the force of the coil spring 35 until the first octagonal cylinder portion 109 of the stationary cylinder 38 fits into the octagonal hole 78 of the stationary plate 31 and the second octagonal cylinder portion 110 fits into the octagonal hole 82 of the second disk 32. Now, the stationary cylinder 38 along with the second disk 32 is secured to the stationary plate 31.

In this state, the engagement ring 103 of the base 15 engages the engagement ring 106 of the stationary cylinder 38 so that the two engagement rings are slidable relative to each other. The engagement projections 105 of the base 15 fit into the engagement recesses 91 of the second spacer 34 so that they can be rotated together. The locking members 36 are situated outside the base 15 and the lower end portions of the cam members 27 fitted over the open-close hinge units 2, 3 engage the upper end portions of the locking members 36.

Next, the first stopper 39 is fitted in the cylinder of the base 15 and pivotally placed on the engagement ring 106 of the stationary cylinder 38. On the first stopper 39 is placed the second stopper 40, with its locking portions 117 securely held under pressure in contact with the inner circumference of the base 15.

In the open-close hinge units 2, 3 of the hinge device, the first spacer 23 is urged toward the first disk 21 at all times by the coil spring 24 so that a cam mechanism involving the balls 22 is formed between the first spacer 23 and the first disk 21. The hole 56 of the first spacer 23 corresponds to the inner guide path 45 of the first disk 21 and the hole 57 corresponds to the outer guide path 44. The balls 22 in the holes 56, 57 roll and move in their associated guide paths 44, 45.

In the pivotal hinge unit 4, the second spacer 34 is urged toward the second disk 32 at all times by the coil spring 35 so that a cam mechanism involving the balls 33 is formed between the second spacer 34 and the second disk 32. The balls 33 put on the second spacer 34 roll and move in the guide path 84 of the second disk 32.

Situated above the locking members 36 are the cam members 27 of the open-close hinge units 2, 3. The upper end portion of each locking member 36 urged upward by the coil spring 37 engages the cam member 27. A pivotal motion of the cam members 27 as the cover member 12 is opened or closed switches the engagement between the locking members 36 and the cam members 27 from the small-diameter portion 76 to the large-diameter portion 77 or vice versa, causing the locking members 36 to move up and down. When the cover member 12 is in a normal state, the long legs 98 of the locking members 36 pass through the square through-holes 96 of the second spacer 34 and fit into the locking holes 79 of the stationary plate 31 situated below the second spacer 34, blocking the pivotal motion of the base 15.

Figure 19:
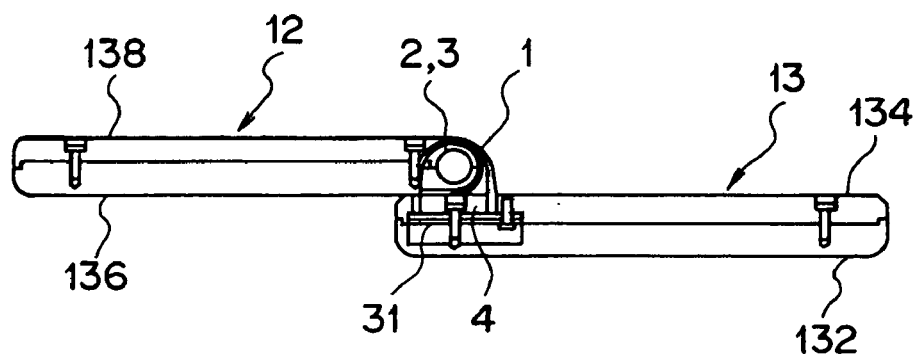
FIG. 19 illustrates the cellphone of this embodiment in a 180-degree open state.

As shown in FIG. 19, when the hinge device 1 is used in a foldable cellphone, the stationary plate 31 of the pivotal hinge unit 4 of the hinge device 1 is fixed to a back case 132 of the body member 13 of the cellphone by screwing set screws into three holes 80, thereby supporting the hinge device 1. Then a front case 134 is secured to the back case 132 as by screws. The cover member 12 of the cellphone is secured, as by screws, to the open-close hinge units 2, 3 held between an outer case 136 and an inner case 138.

Now, a basic operation of the hinge device 1 will be explained. With the cover member 12 of the cellphone closed, the ball 22 in the hole 57 of the first spacer 23 of the open-close hinge unit 2, 3 engages the first recessed portion 46 in the outer guide path 44 of the first disk 21, while the other ball 22 in the hole 56 engages the first recessed portion 49 in the inner guide path 45. When the cover member 12 is closed, the ball 22 in the first spacer 23 is made to rest on an inclined surface of the first recessed portion 46 of the first disk 21 on the front side of the center so that a bias force to close the cover member 12 is maintained to prevent the cover member 12 from becoming loose at the closed position.

As for the pivotal hinge unit 4, when the cover member 12 is in a closed position, the large-diameter portions 77 of the cam members 27 engage the associated locking members 36, which are pushed down with their long legs 98 fitted into the locking holes 79 of the stationary plate 31. Hence, the second spacer 34 and the base 15 are held unrotatable and the cover member 12 is therefore prevented from pivoting left and right. At this time, the four balls 33 in the second spacer 34 engage the recesses 86 of the second disk 32.

The stationary cylinder 38 is always held in a fixed state and the base 15 is rotated about the stationary cylinder 38 as a pivotal shaft. The second stopper 40 rotates with the base 15, and at the same time the thick engagement portion 114 of the first stopper 39 engages and rotates with the thick locking portion 119 of the second stopper 40. The thick engagement portion 114 of the first stopper 39 engages the projection 108 of the stationary cylinder 38 to restrict the pivotal motion of the base 15.

When the cover member 12 is at a reference position where it is aligned in the same direction as the body member 13, the thick locking portion 119 of the second stopper 40 is situated above the projection 108 of the stationary cylinder 38. As the base 15 (cover member 12) is rotated left, the second stopper 40 rotates with it, rotating the free first stopper 39 until the thick engagement portion 114 of the first stopper 39 engages the projection 108 of the stationary cylinder 38, i.e., until the base 15 rotates 180 degrees counterclockwise and stops.

If the base 15 in this state is rotated 180 degrees clockwise, the cover member 12 returns to the reference position. If the base 15 is further rotated clockwise, the thick locking portion 119 of the second stopper 40 engages the thick engagement portion 114 of the first stopper 39 from the opposite side and rotates it until the thick engagement portion 114 abuts against the projection 108 of the stationary cylinder 38, i.e., until the base 15 rotates 180 degrees clockwise and stops. Thus, the base 15 can be rotated 180 degrees counterclockwise and clockwise and the first stopper 39 can be rotated 90 degrees counterclockwise and clockwise.

Figure 20:
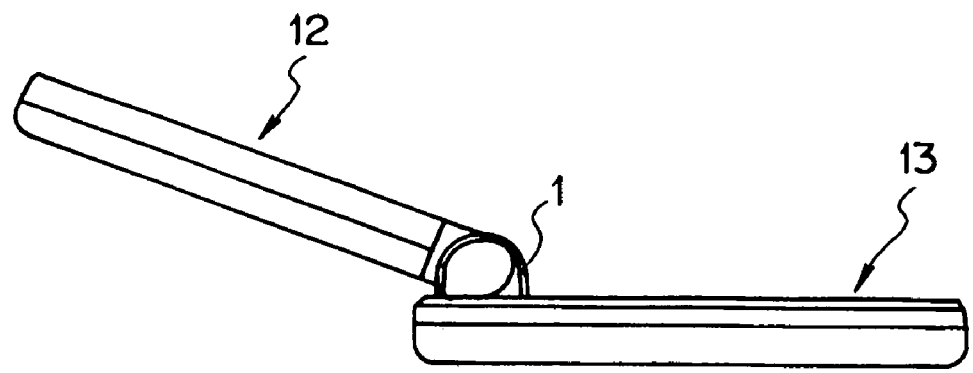
FIG. 20 illustrates the cellphone of this embodiment in a first open position.
Figure 21:
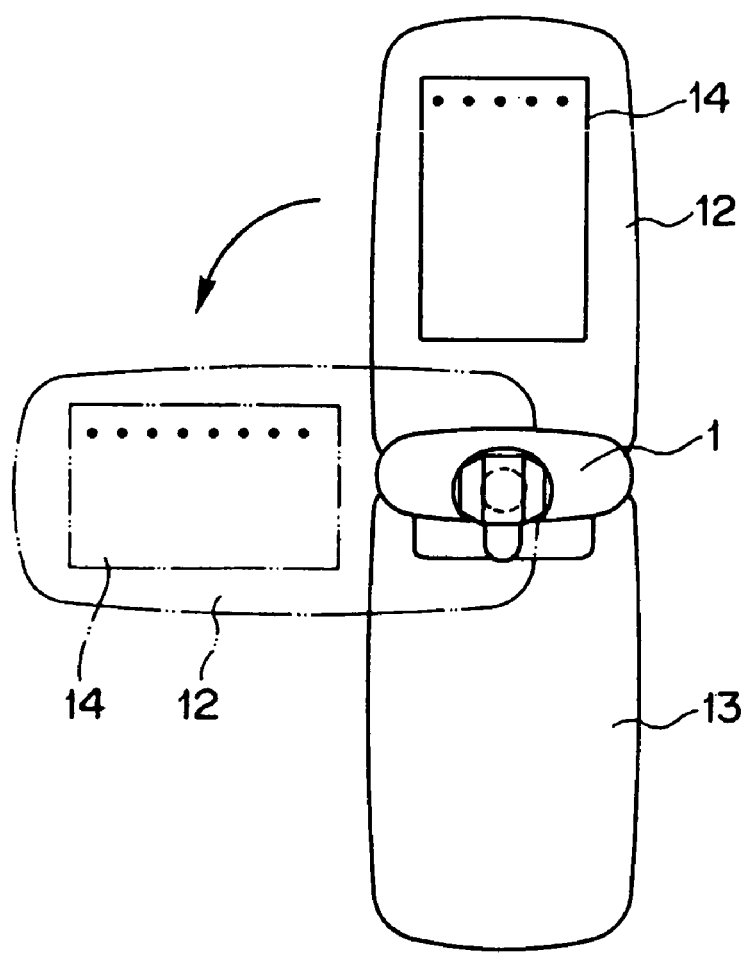
FIG. 21 illustrates the cellphone of this embodiment in a first pivoted position.

Next, the open-close operation of the cover member 12 of a cellphone using the above hinge device will be explained. When the cover member 12 is opened, it is stopped at a first open position and a second open position. The first open position is at an opening angle of smaller than 180 degrees (about 160 degrees), as shown in FIG. 20, at which position the cellphone can be operated. If the cover member 12 is further opened to about 180 degrees, the second open position is reached, as shown in FIG. 19, where the opening action of the cover member 12 is stopped. A further opening of the cover member 12 is prevented by a stop mechanism. At the second open position the cover member 12 can be pivoted left and right.

In the cellphone using the above hinge device, when the cover member 12 is opened by hand, the open-close hinge units 2, 3 are activated. At this time, the cam member 27, the case 25 and the first spacer 23 are pivoted to cause the balls 22 held in the first spacer 23 to move out of the first recessed portions 46, 49 of the first disk 21. As the first spacer 23 turns, the balls 22 move along the guide paths 44, 45 of the first disk 21 toward the second recessed portions 47, 50. When the cover member 12 reaches the first open position, the balls 22 fall into the second recessed portions 47, 50 with a click and are held there by the biasing force of the coil spring 24.

While the cover member 12 is moving between the closed position and the first open position, the large-diameter portions 77 of the cam members 27 engage the locking members 36 which are therefore kept at a pushed-down position, with their long legs 98 fitted in the locking holes 79 of the stationary plate 31. Thus, the second spacer 34 and the base 15 are held unrotatable, blocking the pivotal movement of the cover member 12.

At this first open position, an operator normally operates the cellphone. At the first open position, the cover member 12 takes a normal longitudinal orientation and, on the vertically elongate display 14, character information is shown in horizontal lines.

When the operator further opens the cover member 12, the balls 22 in the first spacer 23 move out of the second recessed portions 47, 50 of the first disk 21. When the cover member 12 reaches the second open position, these balls 22 fall into the third recessed portions 48, 51 with a click and are held at this position. At the same time, when the cover member 12 is moved from the first open position to the second open position, the portions of the cam members 27 that engage with the locking members 36 change from the large-diameter portion 77 to the small-diameter portion 76. Thus, the locking members 36 are pushed up by the coil springs 37, lifting their long legs 98 from the locking holes 79 of the stationary plate 31, with the result that the coil spring 24 and the base 15 are freed from the rotation-locked state.

At the second open position, the hinge mechanism of the hinge device 1 switches its operation from the open-close hinge units 2, 3 to the pivotal hinge unit 4. If an operator pivots the cover member 12 counterclockwise from a pivotal reference position, the four balls 33 in the second spacer 34 move out of the recesses 86 of the second disk 32 and roll along the guide path 84.

At this time, the free end of the long leg 98 of each locking member 36 slidably engages the surface of the stationary plate 31. If the cover member 12 is operated in the close direction, for example, the cam member 27 engaging the locking member 36 is supposed to shift from the small-diameter portion 76 to the large-diameter portion 77. But since the locking members 36 are blocked by the stationary plate 31 from moving down, the cam member cannot rotate, preventing the cover member 12 from being closed. When the cover member 12 reaches a first pivotal position 90 degrees from the pivotal reference position, the four balls 33 fall into the next recesses 86 with a click and are held there by the biasing force of the coil spring 35.

At this first pivotal position, the operator can operate the cellphone. At the first pivotal position, the cover member 12 lies in a lateral orientation so that the display 14 of the cover member 12 is laterally elongate when viewed from the operator. Thus, in this state characters and figures can be shown in horizontally long rows on the laterally elongate display 14. Particularly when a large volume of character information is displayed, the laterally long display mode is easy to see on the part of the operator. Further, when character information entered by the operator is displayed, it is more easy to read if shown on the laterally elongate display.

If the operator further turns the cover member 12 counterclockwise, the thick locking portion 119 of the second stopper 40 that rotates together with the base 15 engages the thick engagement portion 114 of the first stopper 39. Then when the cover member 12 arrives at a second pivotal position 180 degrees from the pivotal reference position, the thick engagement portion 114 of the first stopper 39 abuts against the projection 108 of the stationary cylinder 38, preventing the cover member 12 from being pivoted any more. At the same time, at the second pivotal position, the balls 33 fall into the next recesses 86 with a click and the cover member 12 is held at this position by the biasing force of the coil spring 35.

At the second pivotal position, the cover member 12 that was turned 180 degrees overlaps the body member 13, making the cell phone look like a folded cell phone, which is compact. In this state, the display 14 of the cover member 12 faces outward allowing for easy handling and management of the cellphone. Thus, if the cellphone is waiting for an incoming call, the cellphone can be made compact and still allows incoming call information shown on the display 14 to be checked as is immediately. At this second pivotal position also, if characters are displayed in horizontally long rows along the longer side of the display 14 of the cover member 12, they can be read easily.

When one wishes to return the pivoted cover member 12 to the original position, the above pivoting operation is reversed. The operation of the cam mechanism involving the second spacer 34 and the second disk 32 is practically the same as that performed during the above pivoting action. That is, the cover member 12 is turned 90 degrees backward, i.e., clockwise. At this first pivotal position, the cover member 12 is again held firmly and the operator may operate the cellphone. If the cover member 12 is turned further back, it returns to the second open position where it was before being pivoted counterclockwise.

If at the second open position the cover member 12 is tilted forward, it returns to the first open position where it is held firmly. At this time the character information on the display 14 of the cover member 12 returns to a short display mode in which the information is displayed along the short side of the display 14. The cover member 12 now can be closed with a click.

With a cellphone using the hinge device 1 of this embodiment, the cover member can not only be opened and closed in a forward-backward direction or longitudinal direction but also be pivoted 90 degrees from the body member. This allows the vertically elongate display to be used as a horizontally elongate display, whereby character information can be displayed in horizontally long rows along the longer side of the display for easy reading, thus providing the user with a freedom of selecting from among various display modes. Further, since the cover member can be pivoted 180 degrees, the cover member lies aligningly over the body member, making the cellphone compact so that it is easy to handle and manage. Since the display of the cover member faces outwardly, information on incoming calls can be checked easily at all times, providing an excellent functionality.

As described above, the hinge device of this invention has a horizontally extending open-close hinge unit that holds the cover member at the first open position where the cellphone can be operated and a vertically extending pivotal hinge unit that holds the cover member at a pivotal position 90 or 180 degrees to the left or right from the reference position. This construction allows the cover member not only to be opened and closed but also to be pivoted to the left and right. Therefore, the cover member can be used in many ways. For example, an appropriate display mode that allows information to be read easily can be chosen according to circumstances, enhancing a degree of freedom of display mode. Further, the cover member can be arranged aligningly over the body member making the cellphone compact so that it is easy to handle and manage. This arrangement also allows the display to be seen at all times, improving the functionality of the phone.

Further, the hinge device of this invention includes a horizontally extending open-close hinge unit that opens and closes the cover member, a vertically extending pivotal hinge unit secured to the body member which pivots the cover member 12 clockwise or counterclockwise, and a means which unlocks the pivotal hinge unit for operation when the cover member is opened beyond the first open position where the cellphone can be operated. This construction has an advantage of allowing the user to choose an appropriate mode of use of the cover member and also provides an excellent functionality.

Further, since the hinge device also has a cam member in the open-close hinge unit and locking members in the pivotal hinge unit which unlock the second spacer for operation when the cover member is opened beyond the first open position, the hinge mechanism can smoothly switch its operation from the open-close hinge unit to the pivotal hinge unit, stabilizing the operation of the cover member.

Further, since first, second and third recessed portions are formed in the guide paths on the first disk of the open-close hinge unit and the first spacer engages the second recessed portions when the cover member is at the first open position, the cover member can be precisely and stably held at the first open position.

Further, the stationary cylinder is formed with a projection; a ring-shaped first stopper formed with a thick engagement portion is arranged on the top of the stationary cylinder; and a second stopper having a thick locking portion and adapted to rotate with the base is arranged on the first stopper. This construction can limit the clockwise and counterclockwise pivotal angle of the cover member to 180 degrees.

Further, since the surface of the cover member that faces the body member is formed with a vertically elongate display, when the cover member is held at a pivotal position at right angles to the body member, the display is horizontally elongate when seen from an operator. This arrangement allows a selection from among a variety of display modes, for example, displaying characters in horizontally long rows along the longer side of the display for easy reading. When the cover member is pivoted to a 180-degree position, the cover member overlaps the body member, making the cellphone compact so that it is easy to handle and manage. Furthermore, since the display of the cover member faces outwardly, information on incoming calls can be checked easily at all times, providing an excellent functionality.

The cellphone of this invention has a construction in which the pivotal hinge unit is secured to the body member, the open-close hinge unit is secured to the cover member, and the body member and the cover member are connected together by the hinge device. This construction allows the cover member not only to be opened and closed but also to be pivoted clockwise and counterclockwise. Therefore, the cover member of a cellphone can be used in many ways. For example, an appropriate display mode that allows information to be read easily can be chosen according to circumstances, enhancing a degree of freedom of display mode. Further, the cover member can be arranged aligningly over the body member making the cellphone compact so that it is easy to handle and manage. This arrangement also allows the display to be seen at all times, improving the functionality of the phone.

The invention claimed is:

1. A hinge device connecting a body member and a cover member, comprising:
   a horizontally extending open-close hinge unit to open and close the cover member and to hold the cover member at a first open position where a cellphone operation can be performed;
   a vertically extending pivotal hinge unit secured to the body member to pivot the cover member clockwise or counterclockwise; and
   a means to unlock the pivotal hinge unit by a cam mechanism to enable a pivotal motion of the pivotal hinge unit when the cover member is opened beyond the first open position where a cellphone operation can be performed;
   wherein the pivotal hinge unit includes:
   a cylindrical base mounting the open-close hinge unit;
   a stationary plate secured to the body member and pivotally supporting the base;
   a second disk secured to the stationary plate;
   a second spacer arranged to pivot with the base and also pivot relative to the second disk when the second spacer is unlocked from the stationary plate by the cam mechanism to enable a pivotal motion of the pivotal hinge unit, the second spacer being adapted to engage and be held to the second disk with a predetermined click by a biasing force at a pivotal position of the cover member 90 or 180 degrees clockwise or counterclockwise from the body member; and
   a stop means to stop the pivotal motion of the cover member at a pivotal position 180 degrees clockwise or counterclockwise from the body member.

2. A hinge device according to claim 1, wherein the stop means includes:
   a first stopper arranged pivotable a predetermined angle with respect to a stationary cylinder erected on the stationary plate; and
   a second stopper arranged pivotable a predetermined angle with respect to the first stopper and adapted to pivot with the base 180 degrees clockwise or counterclockwise from the body member.

3. A hinge device according to claim 2, wherein the open-close hinge unit includes:
   a first disk secured to the pivotal hinge unit; and
   a first spacer arranged pivotable relative to the first disk and adapted to engage and be held to the first disk by a biasing force at the first open position;

wherein the first open position of the cover member has an opening angle to the body member of about 160 degrees.

4. A hinge device according to claim 1, wherein the means to enable the pivotal motion includes:

an annular cam member installed in the open-close hinge unit, the cam member being adapted to pivot as the cover member is opened and closed; and a locking member arranged in the pivotal hinge unit to engage an outer circumference of the cam member, the locking member being adapted to move up or down as the cam member pivots, the locking member being unlocked from the stationary plate to enable the pivotal motion of the second spacer when the cover member is opened beyond the first open position.

5. A hinge device according to claim 4, wherein the stop means in the pivotal hinge unit includes:

a projection formed on a top surface of the stationary cylinder erected on the stationary plate, the projection being raised over a part of a whole circumference of the stationary cylinder;

an annular first stopper pivotally mounted on the stationary cylinder, the first stopper having a part of its whole circumference raised vertically upward and downward to form a thick engagement portion that engages the projection; and a second stopper mounted on the first stopper and adapted to pivot with the base, the second stopper having a part of a whole circumference of its hollow disk raised downward to form a thick locking portion that engages the thick engagement portion.

6. A hinge device according to claim 1, wherein the open-close hinge unit includes:

a first disk secured to the pivotal hinge unit; and a first spacer arranged pivotable relative to the first disk and adapted to engage and be held to the first disk by a biasing force at the first open position;

wherein the first disk of the open-close hinge unit is formed with concentric circular guide paths, these guide paths are formed with first recessed portions, and at positions in each of the guide paths shifted to left and right from a position which is center-symmetric with the first recessed portions, second and third recessed portions are formed;

wherein balls are arranged in the first spacer so that they are interposed between the first spacer and the first disk, and the first spacer is biased so that it engages and is held to the second recessed portions when the cover member is at the first open position and that, when the cover member is opened beyond the first open position, the first spacer engages and is held to the third recessed portions.

7. A hinge device according to claim 1, wherein the stop means in the pivotal hinge unit includes:

a projection formed on a top surface of the stationary cylinder erected on the stationary plate, the projection being raised over a part of a whole circumference of the stationary cylinder;

an annular first stopper pivotally mounted on the stationary cylinder, the first stopper having a part of its whole circumference raised vertically upward and downward to form a thick engagement portion that engages the projection; and a second stopper mounted on the first stopper and adapted to pivot with the base, the second stopper having a part of a whole circumference of its hollow disk raised downward to form a thick locking portion that engages the thick engagement portion.

* * * * *